United States Patent
Yoshida et al.

(10) Patent No.: US 9,624,587 B2
(45) Date of Patent: Apr. 18, 2017

(54) WATER ELECTROLYSIS SYSTEM

(71) Applicant: HONDA MOTOR CO., LTD., Tokyo (JP)

(72) Inventors: Tetsuya Yoshida, Wako (JP); Koji Nakazawa, Wako (JP); Hisashi Nagaoka, Wako (JP); Jun Takeuchi, Wako (JP); Daisuke Kurashina, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

(21) Appl. No.: 14/846,827

(22) Filed: Sep. 7, 2015

(65) Prior Publication Data
US 2016/0068976 A1   Mar. 10, 2016

(30) Foreign Application Priority Data
Sep. 8, 2014   (JP) .................. 2014-181861

(51) Int. Cl.
C25B 1/08   (2006.01)
C25B 9/08   (2006.01)

(52) U.S. Cl.
CPC . *C25B 9/08* (2013.01); *C25B 1/08* (2013.01)

(58) Field of Classification Search
None
See application file for complete search history.

(56) References Cited

U.S. PATENT DOCUMENTS

| | | | |
|---|---|---|---|
| 5,980,726 A * | 11/1999 | Moulthrop, Jr. | C25B 1/02 204/239 |
| 7,744,733 B2 * | 6/2010 | Khan | H01M 8/04253 204/255 |
| 8,361,304 B2 * | 1/2013 | Yoshida | C25B 1/04 204/252 |
| 2003/0148171 A1 * | 8/2003 | Mitlitsky | C25B 15/00 429/53 |
| 2005/0121315 A1 * | 6/2005 | Baltrucki | C25B 15/00 204/228.4 |
| 2008/0310106 A1 * | 12/2008 | Sabharwal | F24F 5/0017 361/695 |
| 2012/0300399 A1 * | 11/2012 | Tian | G06F 1/20 361/692 |

FOREIGN PATENT DOCUMENTS

JP   2011-225964   11/2011

* cited by examiner

*Primary Examiner* — Harry D Wilkins, III
(74) *Attorney, Agent, or Firm* — Mori & Ward, LLP

(57) ABSTRACT

A water electrolysis system includes a water electrolysis apparatus, an electric component, and a casing. The electric component is to operate the water electrolysis apparatus. The casing includes a housing chamber, an electric component chamber, and a buffering chamber. The housing chamber has a first ventilation air inlet to introduce external air into the housing chamber and houses the water electrolysis apparatus. The electric component chamber has a second ventilation air inlet to introduce the external air into the electric component chamber and houses the electric component. The first ventilation air inlet and the second ventilation air inlet are separate from each other. The buffering chamber is in communication with the first ventilation air inlet and the second ventilation air inlet. An air pressure in the buffering chamber is to be maintained at atmospheric pressure.

12 Claims, 6 Drawing Sheets

WATER ELECTROLYSIS SYSTEM

CROSS-REFERENCE TO RELATED APPLICATIONS

The present application claims priority under 35 U.S.C. §119 to Japanese Patent Application No. 2014-181861, filed Sep. 8, 2014, entitled "Water Electrolysis System." The contents of this application are incorporated herein by reference in their entirety.

BACKGROUND

1. Field

The present disclosure relates to a water electrolysis system.

2. Description of the Related Art

Fuel cells produce electricity by using hydrogen gas, for example, as fuel gas. Water electrolysis apparatuses are widely used in the production of the hydrogen gas. A water electrolysis apparatus uses a solid polymer electrolyte membrane to generate hydrogen (and oxygen) by electrolysis of water. Electrode catalyst layers are disposed on respective opposite sides of the solid polymer electrolyte membrane to constitute a membrane electrode assembly. Current collectors are disposed on respective opposite sides of the membrane electrode assembly to constitute a unit.

A plurality of such units are stacked, and a voltage is applied across the stack while water is supplied to anode current collectors. Thus, the water is electrolyzed to generate hydrogen ions (protons) on the anode side of the membrane electrode assembly. The hydrogen ions move through the solid polymer electrolyte membranes to the cathode side, where the hydrogen ions combine with electrons to generate hydrogen. On the anode side, oxygen generated together with hydrogen is discharged with excess water from the units.

As disclosed in Japanese Unexamined Patent Application Publication No. 2011-225964, for example, a water electrolysis system of this type includes a water electrolysis apparatus and a casing having a housing chamber that houses the water electrolysis apparatus. The casing has a first electric component chamber and a second electric component chamber that are separate from the housing chamber. The first electric component chamber houses a first electric component and includes a fan for introducing external air. The second electric component chamber houses a second electric component and communicates with the first electric component chamber through a pipe.

SUMMARY

According to one aspect of the present invention, a water electrolysis system includes a water electrolysis apparatus, an electric component, and a casing. The water electrolysis apparatus includes an electrolyte membrane and current collectors disposed on respective opposite anode and cathode sides of the electrolyte membrane. The water electrolysis apparatus electrolyzes water generates oxygen on the anode side and hydrogen on the cathode side. The electric component is for operating the water electrolysis apparatus. The casing has a housing chamber that houses the water electrolysis apparatus and an electric component chamber that houses the electric component. The housing chamber has a first ventilation air inlet for introducing external air and the electric component chamber has a second ventilation air inlet for introducing external air. The first ventilation air inlet and the second ventilation air inlet are separate from each other. The casing further has a buffering chamber maintained at atmospheric pressure and in communication with the first ventilation air inlet and the second ventilation air inlet.

According to another aspect of the present invention, a water electrolysis system includes a water electrolysis apparatus, an electric component, and a casing. The water electrolysis apparatus includes an electrolyte membrane, a first current collector, and a second current collector. The electrolyte membrane has an anode side and a cathode side opposite to the anode side. The first current collector is disposed on the anode side. The second current collector is disposed on the cathode side. the water electrolysis apparatus is to electrolyze water to generate oxygen on the anode side and hydrogen on the cathode side. The electric component is to operate the water electrolysis apparatus. The casing includes a housing chamber, an electric component chamber, and a buffering chamber. The housing chamber has a first ventilation air inlet to introduce external air into the housing chamber and houses the water electrolysis apparatus. The electric component chamber has a second ventilation air inlet to introduce the external air into the electric component chamber and houses the electric component. The first ventilation air inlet and the second ventilation air inlet are separate from each other. The buffering chamber is in communication with the first ventilation air inlet and the second ventilation air inlet. An air pressure in the buffering chamber is to be maintained at atmospheric pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
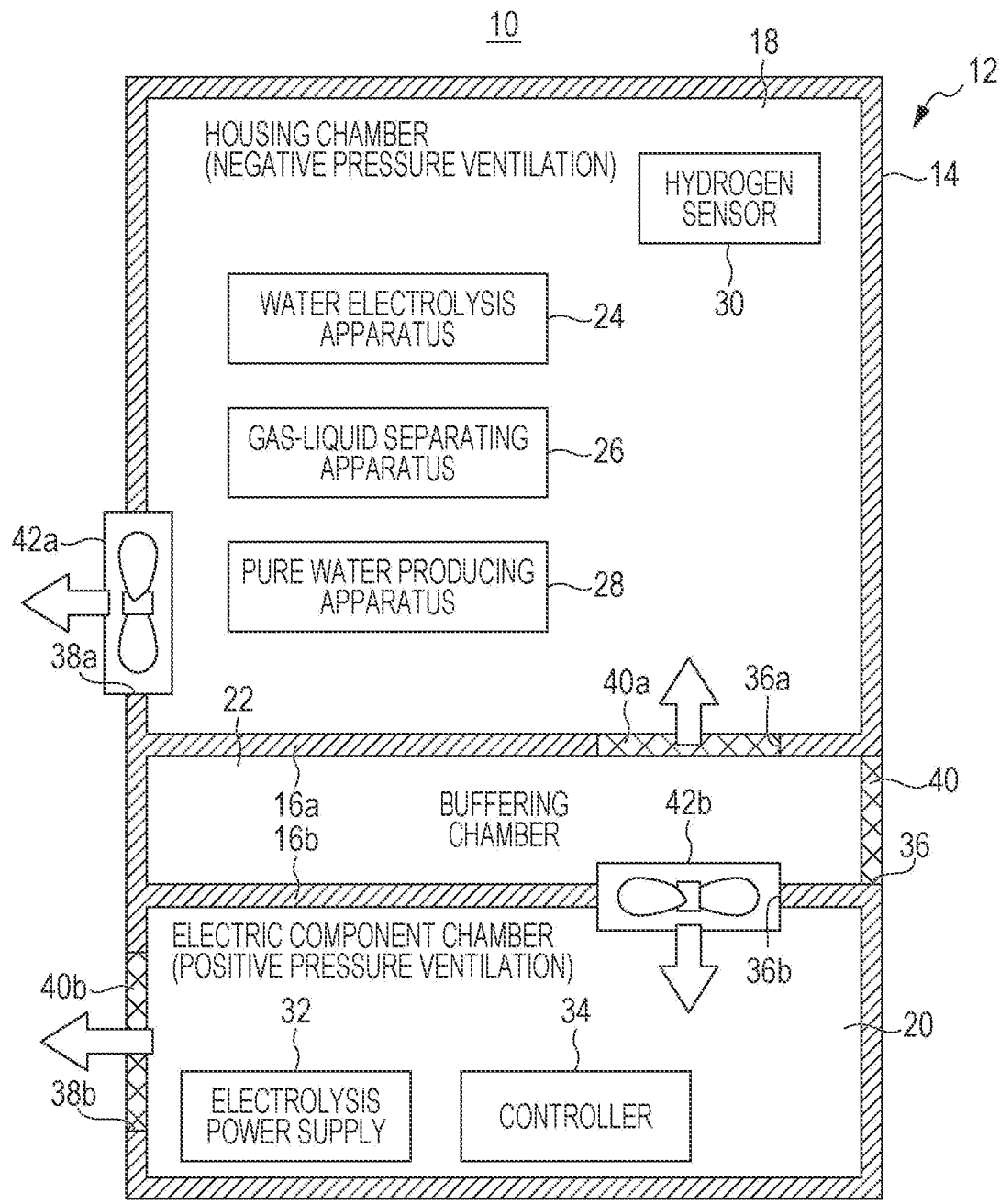
FIG. 1 is a view illustrating an internal structure of a water electrolysis system in a first embodiment of the present application.

The embodiments will now be described with reference to the accompanying drawings, wherein like reference numerals designate corresponding or identical elements throughout the various drawings.

As illustrated in FIG. 1, a water electrolysis system 10 in a first embodiment of the present application includes a casing 12. The casing 12 includes an external wall 14, a first internal wall 16a, and a second internal wall 16b. The first internal wall 16a and the second internal wall 16b are flat plates adjacent to each other in the casing 12 at a position near to one side of the casing 12.

In the casing 12, the first internal wall 16a defines a housing chamber 18, the second internal wall 16b defines an electric component chamber 20, and the first internal wall 16a and the second internal wall 16b define a buffering chamber 22 therebetween. The housing chamber 18 has the largest capacity and the buffering chamber 22 has the smallest capacity, for example. The electric component chamber 20 may have the smallest capacity in some cases. The buffering chamber 22 is maintained at atmospheric pressure.

The housing chamber 18 houses a water electrolysis apparatus 24 that electrolyzes water (pure water) to generate oxygen and hydrogen, a flammable gas (hydrogen, for example) handling device such as a gas-liquid separating apparatus 26, and a pure water producing apparatus 28. Further examples of the flammable gas (hydrogen, for example) handling device include pipes, valves, and electric devices, which are housed in the housing chamber 18 as necessary.

Although not illustrated, the water electrolysis apparatus 24 includes a plurality of stacked unit cells and, in each of the unit cells, a membrane electrode assembly is sandwiched between an anode separator and a cathode separator.

Water is supplied to the water electrolysis apparatus 24 to circulate therein. The gas-liquid separating apparatus 26 decomposes the water expelled from the water electrolysis apparatus 24 into oxygen and hydrogen (gas component) and stores the water. The pure water producing apparatus 28 supplies pure water generated from tap water to the gas-liquid separating apparatus 26. At an upper side in the housing chamber 18, a hydrogen sensor (gas detector) 30 for detecting hydrogen (flammable gas) is disposed.

The electric component chamber 20 houses electric components such as an electrolysis power supply 32 and a controller 34. The electrolysis power supply 32 has a positive electrode and a negative electrode connected to an anode side and a cathode side, respectively of the water electrolysis apparatus 24. The controller 34 controls overall operation of the water electrolysis system 10.

The first internal wall 16a has a first ventilation air inlet 36a for introducing external air into the housing chamber 18. The second internal wall 16b has a second ventilation air inlet 36b for introducing the external air into the electric component chamber 20. The first ventilation air inlet 36a and the second ventilation air inlet 36b are in communication with the buffering chamber 22. The external wall 14 has a ventilation air inlet 36 for introducing the external air into the buffering chamber 22. The external wall 14 further has a first ventilation air outlet 38a for expelling the external air from the housing chamber 18 and a second ventilation air outlet 38b for expelling the external air from the electric component chamber 20.

A first filter 40a is disposed in the first ventilation air inlet 36a and a first fan (first ventilator) 42a is disposed in the first ventilation air outlet 38a. The first fan 42a draws air out of the housing chamber 18 to maintain the housing chamber 18 at a negative pressure. A second fan (second ventilator) 42b is disposed in the second ventilation air inlet 36b. The second fan 42b sends the external air into the electric component chamber 20 to maintain the electric component chamber 20 at a positive pressure. A second filter 40b is disposed in the second ventilation air outlet 38b. A filter 40 is disposed in the ventilation air inlet 36. Since the filter 40 is disposed in the ventilation air inlet 36, the first filter 40a may not be disposed in the first ventilation air inlet 36a.

Operation of the water electrolysis system 10 having the above-described configuration is described below.

First, when the water electrolysis system 10 is activated, the second fan 42b is switched on. External air is forcibly introduced into the electric component chamber 20 by the second fan 42b, and the electric component chamber 20 is maintained at a positive pressure while being ventilated.

Next, the first fan 42a is switched on. The air in the housing chamber 18 is expelled from the housing chamber 18, and the housing chamber 18 is maintained at a negative pressure while being ventilated. At this time, the hydrogen sensor 30 is switched on to determine the presence (density) of flammable gas (hydrogen gas) in the housing chamber 18.

Then, auxiliary devices such as the pure water producing apparatus 28 and the electrolysis power supply 32 are switched on, and the water electrolysis apparatus 24 starts producing hydrogen. Specifically, the pure water producing apparatus 28 produces pure water from tap water. Then, the produced pure water is supplied to the gas-liquid separating apparatus 26, and water is supplied to each unit cell. The electrolysis power supply 32 applies a voltage to the water electrolysis apparatus 24. In each cell unit, the water supplied to the anode side is electrolyzed to generate hydrogen ions, electrons, and oxygen. The hydrogen ions generated by the anodic reaction move to the cathode side and combine with the electrons to produce hydrogen.

When the water electrolysis apparatus 24 ends its hydrogen production, the water electrolysis system 10 shifts into a standby mode. In the standby mode, the electric component chamber 20 continues to be maintained at the positive pressure while being ventilated by the second fan 42b, and the first fan 42a is switched off. To start producing hydrogen again, the first fan 42a is switched on. The water electrolysis apparatus 24 resumes the hydrogen production as described above.

In the first embodiment, the casing 12 has the buffering chamber 22 maintained at atmospheric pressure. The buffering chamber 22 communicates with the first ventilation air inlet 36a of the housing chamber 18 and the second ventilation air inlet 36b of the electric component chamber 20.

A pressure difference may occur between the housing chamber 18 and the electric component chamber 20 since the housing chamber 18 is maintained at a negative pressure while being ventilated and since the electric component chamber 20 is maintained at a positive pressure while being ventilated. However, with the above-described configuration, the housing chamber 18 and the electric component chamber 20 may not be affected by the pressure difference. Particularly, the above-described configuration appropriately prevents backflow of the ventilation air (including flammable gas) into the electric component chamber 20. This enables the water electrolysis system to have a simple and low-cost configuration and to provide adequate ventilation. In addition, a sealing structure for completely sealing each of the housing chamber 18 and the electric component chamber 20 is not required, which also contributes to the low cost.

Figure 2:
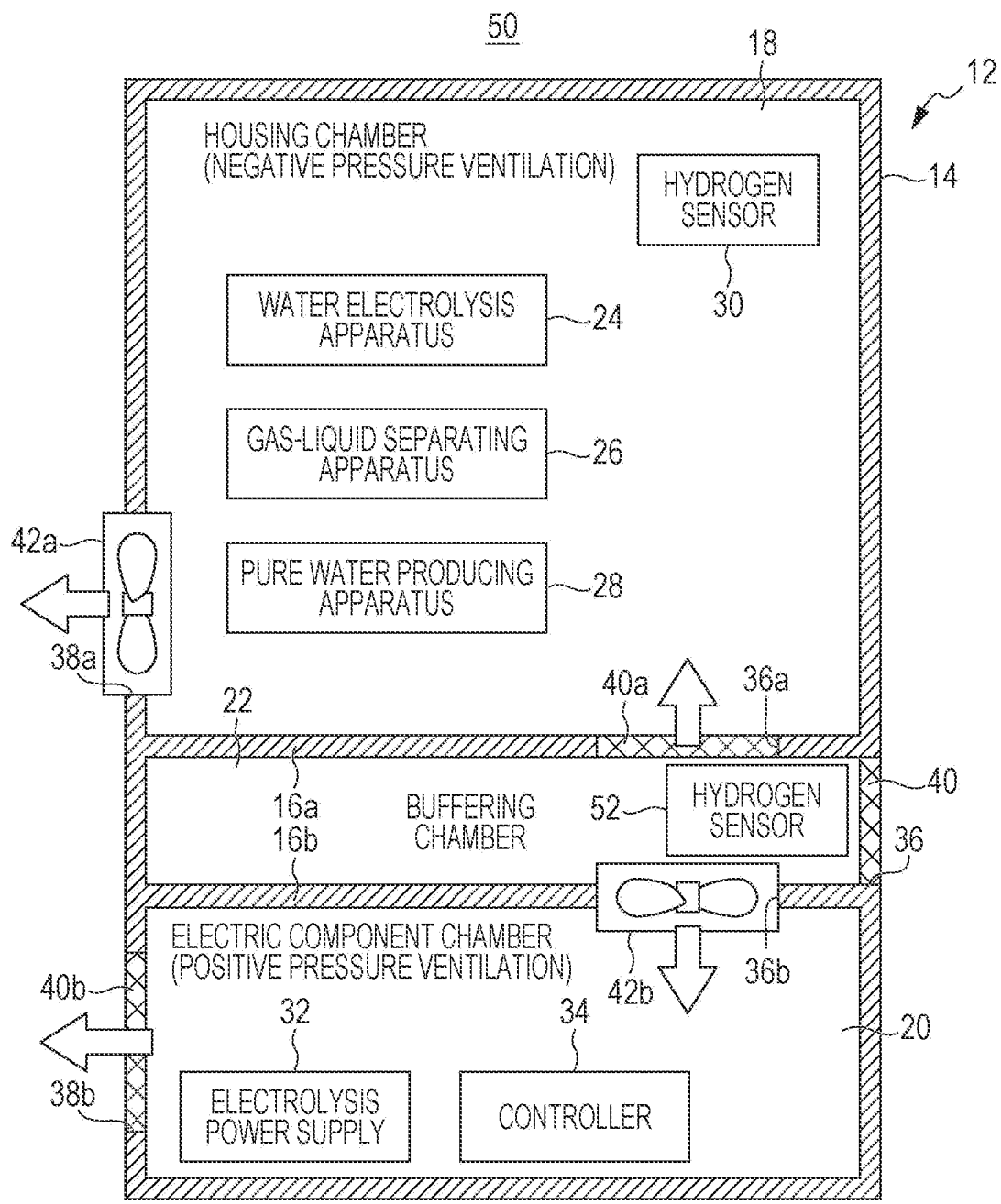
FIG. 2 is a view illustrating an internal structure of a water electrolysis system in a second embodiment of the present application.

FIG. 2 illustrates an internal configuration of a water electrolysis system 50 in a second embodiment of the present application. Components that are the same as those in the water electrolysis system 10 in the first embodiment are assigned the same reference numerals as those in the first embodiment, and detailed description thereof is omitted. The same is applicable to a third embodiment, which will be described later, and detailed explanation of the components that are the same as those in the water electrolysis system 10 is omitted.

In the water electrolysis system 50, another hydrogen sensor (gas detector) 52 is disposed adjacent to the ventilation air inlet 36, which is an inlet to the buffering chamber 22. With this configuration, the flammable gas contained in the external air can be appropriately detected, and thus the water electrolysis system 50 can be suitably used in an area where flammable gas usually exists. Only one hydrogen sensor 52 is required to be added to obtain this advantage, which contributes to the low cost.

Figure 3:
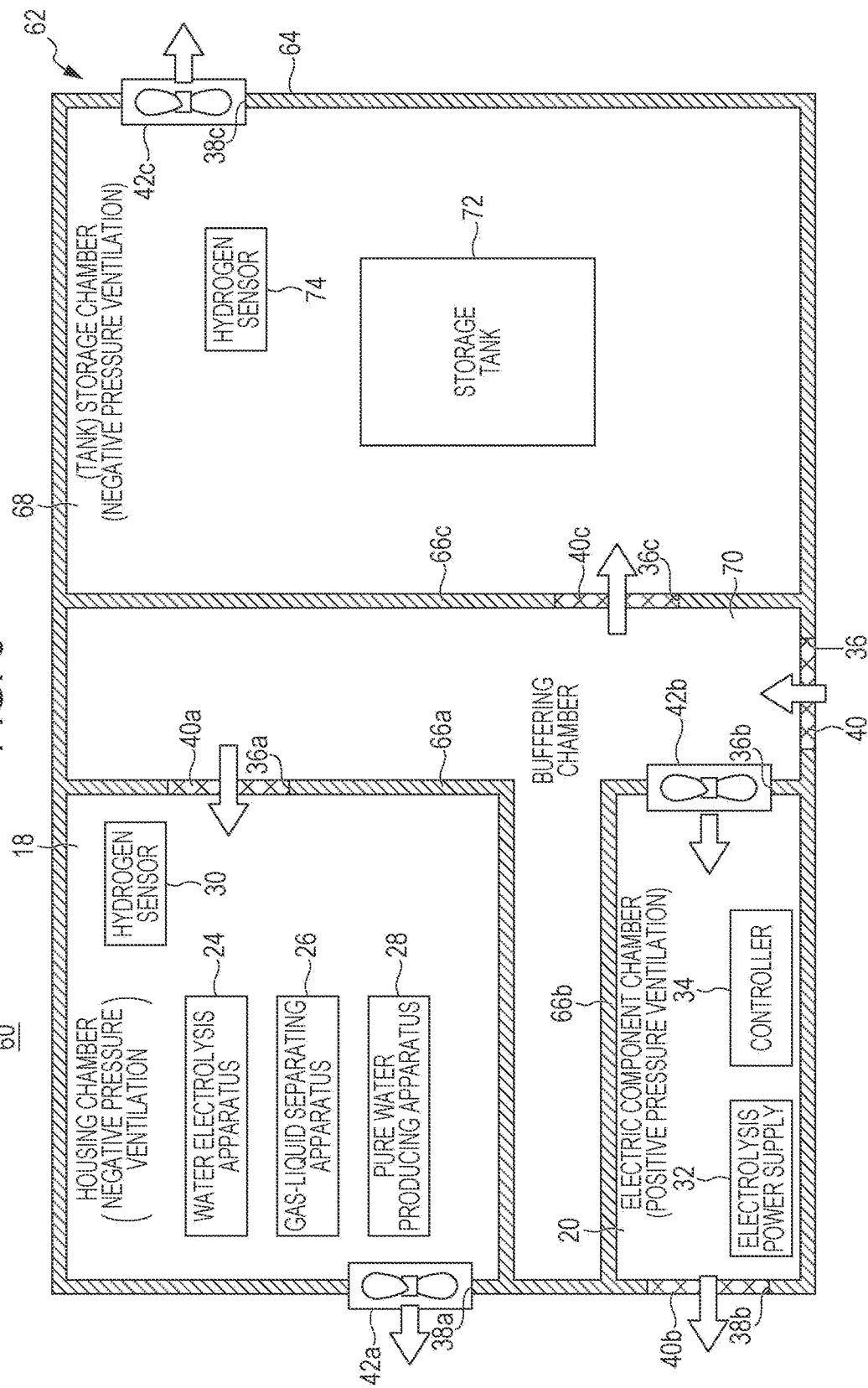
FIG. 3 is a view illustrating an internal structure of a water electrolysis system in a third embodiment of the present application.

FIG. 3 illustrates an internal configuration of a water electrolysis system 60 in a third embodiment of the present application.

The water electrolysis system 60 includes a casing 62 that includes an external wall 64. The casing 62 has a housing chamber 18 defined by a first internal wall 66a, an electric component chamber 20 defined by a second internal wall 66b, and a storage chamber 68 defined by a third internal wall 66c. The first internal wall 66a and the second internal wall 66b each have an L-like shape, for example, and are separate from each other. The third internal wall 66c is a flat plate. The first internal wall 66a, the second internal wall 66b, and the third internal wall 66c define a buffering chamber 70. The shape of the first internal wall 66a and that of the second internal wall 66b are not limited to the L-like shape and may be any other shape.

The storage chamber 68 houses a storage tank (reservoir) 72 that stores hydrogen generated by the water electrolysis apparatus 24. The third internal wall 66c has a third ventilation air inlet 36c open to the buffering chamber 70 for introducing the external air into the storage chamber 68. The external wall 64 has a third ventilation air outlet 38c for expelling the external air from the storage chamber 68.

A third filter 40c is disposed in the third ventilation air inlet 36c, and a third fan (third ventilator) 42c for drawing air out of the storage chamber 68 is disposed in the third ventilation air outlet 38c to maintain the storage chamber 68 at a negative pressure. A hydrogen gas sensor (gas detector) 74 is disposed in the storage chamber 68. Since the filter 40 is disposed in the ventilation air inlet 36, the first filter 40a and the third filter 40c may not be disposed in the first ventilation air inlet 36a and the third ventilation air inlet 36c, respectively. The same is applicable to the fourth to sixth embodiments, which will be described below.

In the third embodiment having the above-described configuration, the casing 62 has the buffering chamber 70 maintained at atmospheric pressure. The buffering chamber 70 is in communication with the first ventilation air inlet 36a of the housing chamber 18, the second ventilation air inlet 36b of the electric component chamber 20, and the third ventilation air inlet 36c of the storage chamber 68.

A pressure difference may occur between the housing chamber 18, the storage chamber 68, and the electric component chamber 20, since the housing chamber 18 and the storage chamber 68 are each maintained at a negative pressure while being ventilated and since the electric component chamber 20 is maintained at a positive pressure while being ventilated. However, with the above-described configuration, the housing chamber 18, the storage chamber 68, and the electric component chamber 20 may not be affected by the pressure difference. Particularly, the above-described configuration appropriately prevents backflow of the ventilation air (including flammable gas) into the electric component chamber 20. This provides the same advantages as those in the first embodiment.

Figure 4:
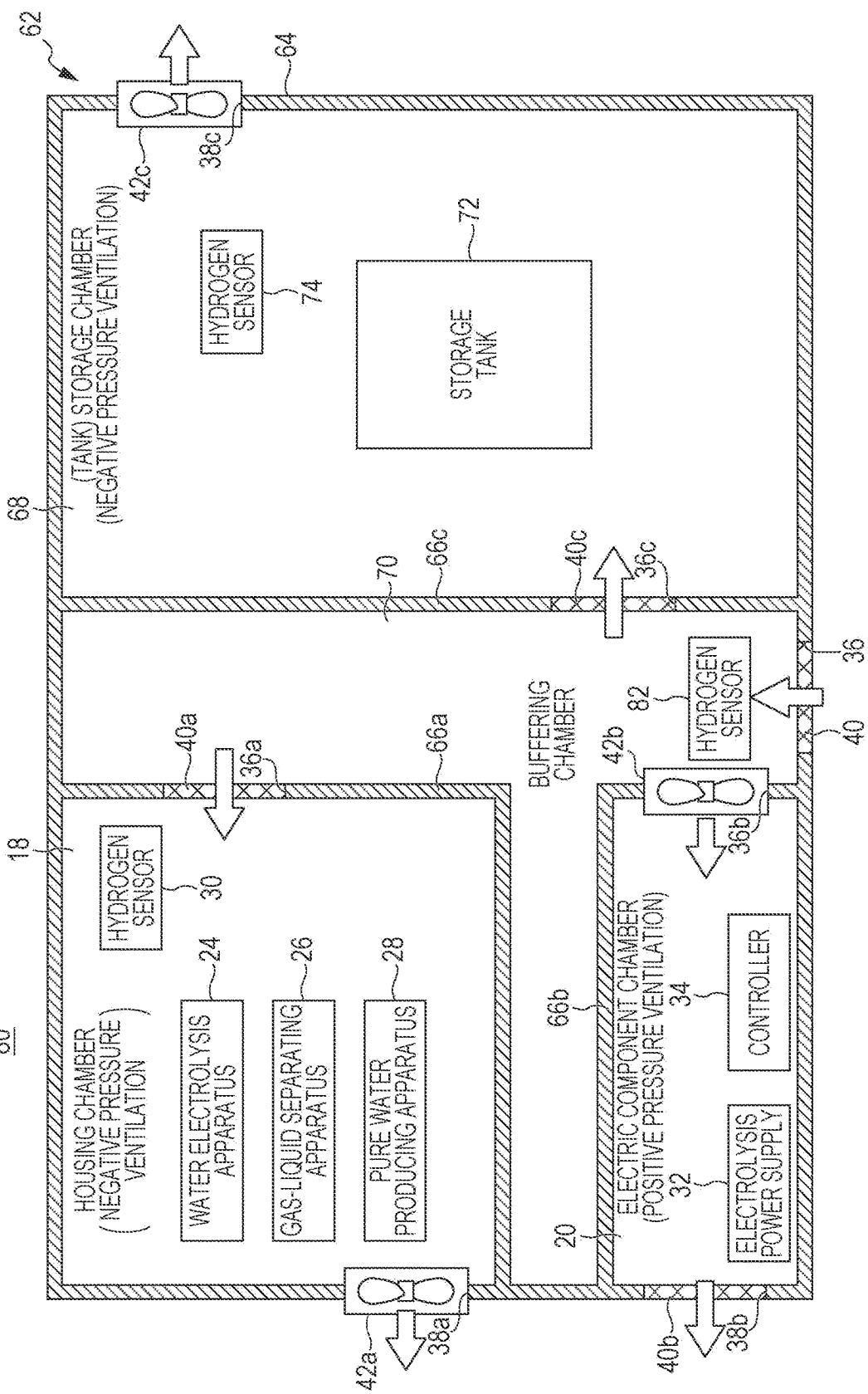
FIG. 4 is a view illustrating an internal structure of a water electrolysis system in a fourth embodiment of the present application.

FIG. 4 illustrates an internal configuration of a water electrolysis system 80 in a fourth embodiment of the present application. Components that are the same as those in the water electrolysis system 60 in the third embodiment are assigned the same reference numerals as those in the third embodiment, and detailed description thereof is omitted. The same is applicable to the fifth or any later embodiments, which will be described, in which detailed explanation of the components that are the same as those in the water electrolysis system 60 is omitted.

In the water electrolysis system 80, a hydrogen sensor (gas detector) 82 is disposed adjacent to the ventilation air inlet 36, which is an entrance to the buffering chamber 70. With this configuration, flammable gas contained in the external air can be appropriately detected, and thus the water electrolysis system 80 can be suitably used in an area where flammable gas usually exists. This provides the same advantages as those in the second embodiment.

Figure 5:
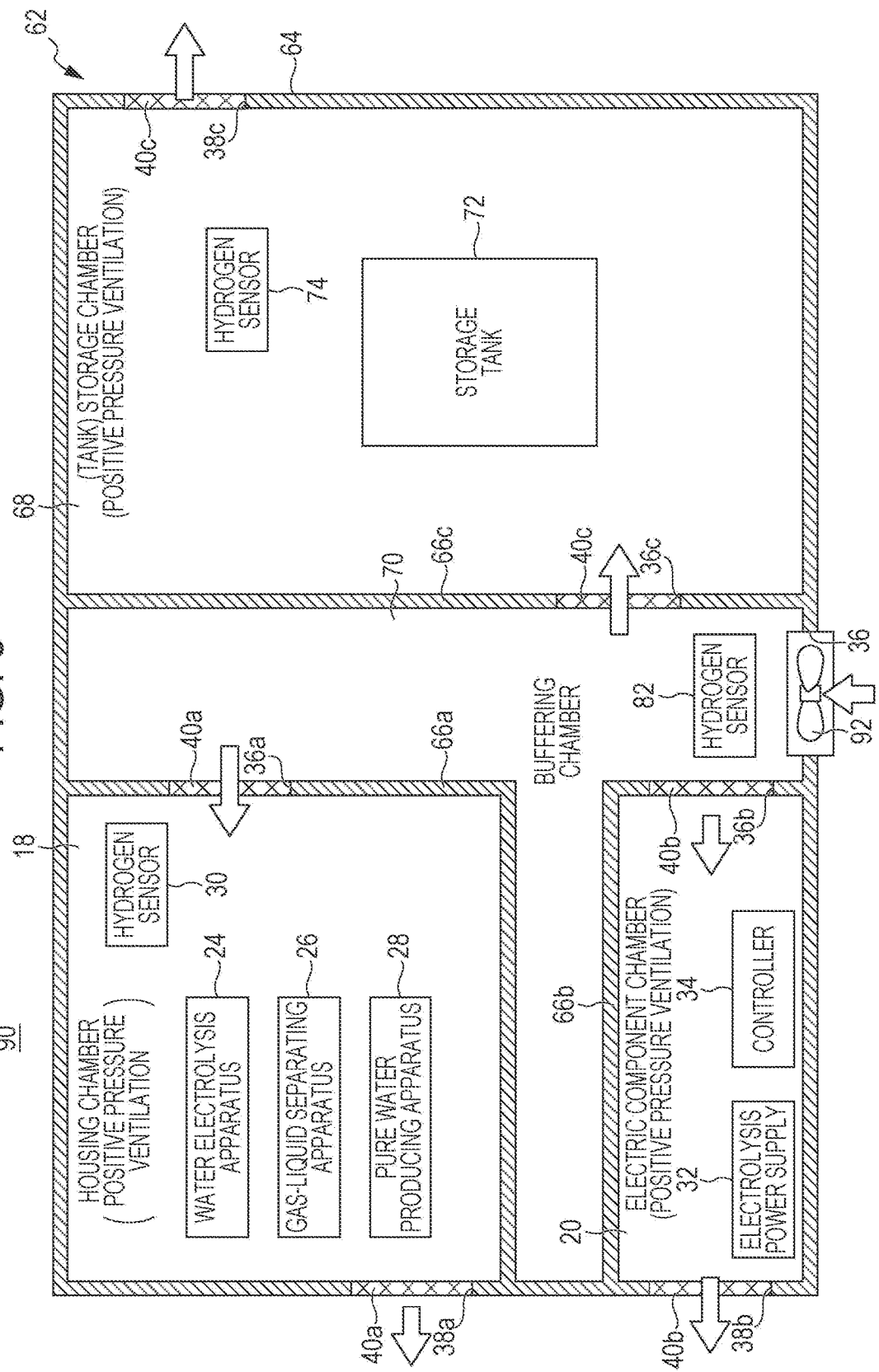
FIG. 5 is a view illustrating an internal structure of a water electrolysis system in a fifth embodiment of the present application.

FIG. 5 is a view illustrating an internal configuration of a water electrolysis system 90 in a fifth embodiment of the present application.

In the water electrolysis system 90, an explosion-proof fan 92 is disposed in the ventilation air inlet 36 of the buffering chamber 70. In this case, the water electrolysis system 90 does not include the first fan 42a, the second fan 42b, or the third fan 42c.

The fifth embodiment having such a configuration includes only the explosion-proof fan 92 and not the first fan 42a, the second fan 42b, or the third fan 42c. Thus, the water electrolysis system 90 has a simpler and lower-cost configuration.

Figure 6:
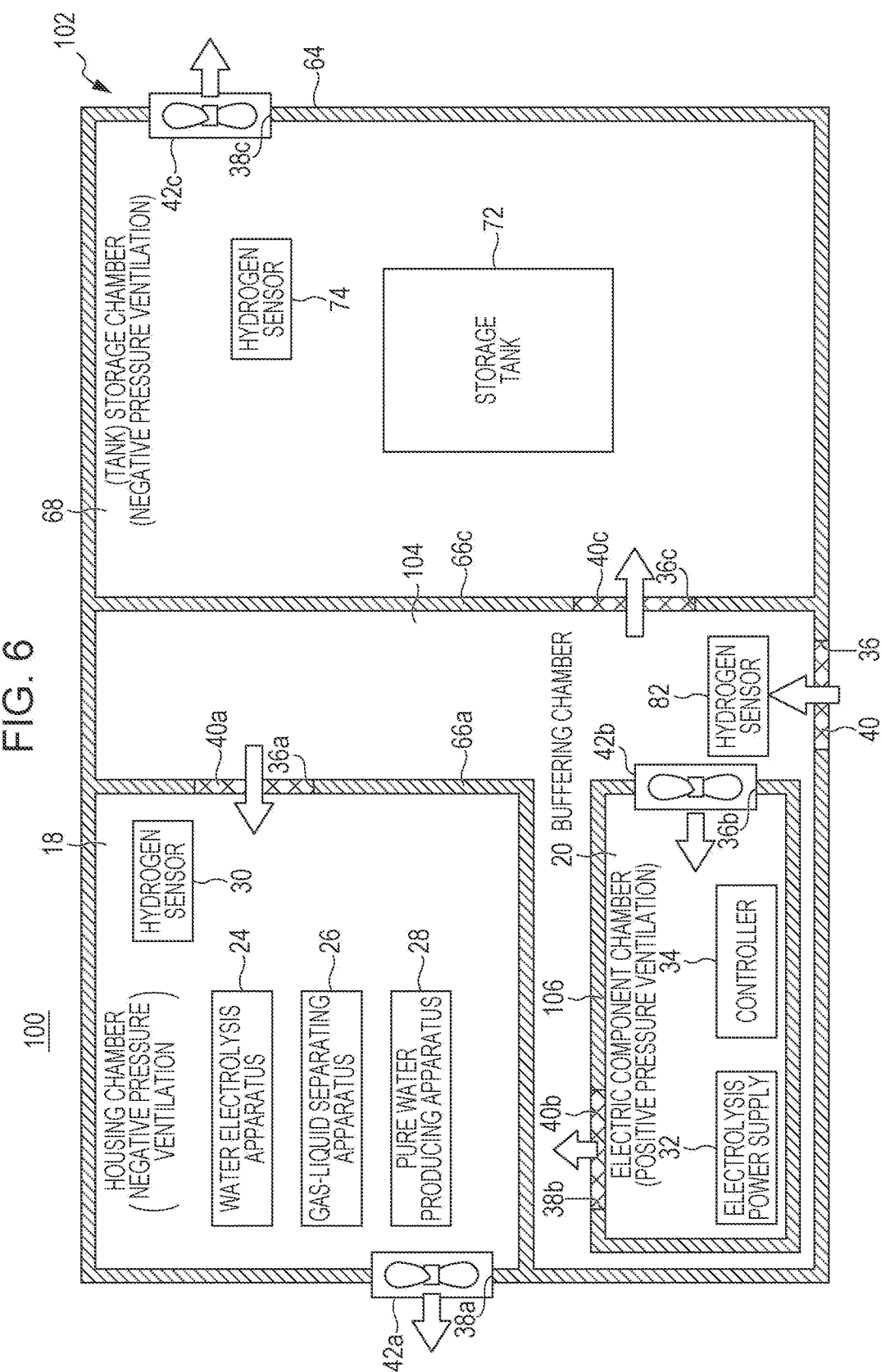
FIG. 6 is a view illustrating an internal structure of a water electrolysis system in a sixth embodiment of the present application.

FIG. 6 is a view illustrating an internal configuration of a water electrolysis system 100 in a sixth embodiment of the present application.

A casing 102 of the water electrolysis system 100 has the housing chamber 18 defined by the first internal wall 66a, the storage chamber 68 defined by the third internal wall 66c, and a buffering chamber 104 defined by the first internal wall 66a and the third internal wall 66c.

In the buffering chamber 104, a case 106 is disposed. The case 106 has the electric component chamber 20 therein, and the second ventilation air inlet 36b and the second ventilation air outlet 38b thereof are open to or in communication with the buffering chamber 104.

In the sixth embodiment having the above-described configuration, the electric component chamber 20 that does not treat flammable gas is completely enclosed within the buffering chamber 104. With this configuration, the electric component chamber 20 is cooled more appropriately. Particularly, the second fan 42b may be switched off when ambient temperatures are low. This reduces power consumption.

A water electrolysis system of this application includes a water electrolysis apparatus, an electric component for operating the water electrolysis apparatus, and a casing. The water electrolysis apparatus includes an electrolyte membrane and current collectors disposed on respective opposite anode and cathode sides of the electrolyte membrane. The water electrolysis apparatus that electrolyzes water generates oxygen on the anode side and hydrogen on the cathode side. The casing has a housing chamber that houses the water electrolysis apparatus and an electric component chamber that houses the electric component.

The housing chamber has a first ventilation air inlet for introducing external air. The electric component chamber has a second ventilation air inlet for introducing external air. The first ventilation air inlet and the second ventilation air inlet are separate from each other. The casing further has a buffering chamber maintained at atmospheric pressure and in communication with the first ventilation air inlet and the second ventilation air inlet.

The water electrolysis system may include a first ventilator configured to draw air out of the housing chamber to maintain the housing chamber at a negative pressure, and a second ventilator configured to send the external air into the electric component chamber to maintain the electric component chamber at a positive pressure.

The water electrolysis system may further include a gas detector for detecting flammable gas. The buffering chamber may have a ventilation air inlet, and the gas detector may be disposed adjacent to the air ventilation inlet.

In the water electrolysis system, the casing may have a storage chamber that houses a reservoir for storing the hydrogen generated by the water electrolysis apparatus. The storage chamber may have a third ventilation air inlet for introducing external air, and the third ventilation air inlet may communicate with the buffering chamber.

In the water electrolysis system, the electric component chamber may be disposed in the buffering chamber, and the electric component chamber may have a ventilation air outlet for expelling air into the buffering chamber.

In the present application, the casing has the buffering chamber in communication with the first ventilation air inlet of the housing chamber and the second ventilation air inlet of the electric component chamber while being maintained at atmospheric pressure. With this configuration, the housing chamber and the electric component chamber may not be affected by a difference in pressure therebetween. This enables the water electrolysis system to have a simple and low-cost configuration and to provide adequate ventilation. In addition, this configuration does not require a sealing structure for completely sealing each of the housing chamber and the electric component chamber, which contributes to the low cost.

Obviously, numerous modifications and variations of the present invention are possible in light of the above teachings. It is therefore to be understood that within the scope of the appended claims, the invention may be practiced otherwise than as specifically described herein.

What is claimed is:

1. A water electrolysis system comprising:
a water electrolysis apparatus including an electrolyte membrane and current collectors disposed on respective opposite anode and cathode sides of the electrolyte membrane, the water electrolysis apparatus that electrolyzes water generates oxygen on the anode side and hydrogen on the cathode side;
an electric component for operating the water electrolysis apparatus; and
a casing having a housing chamber that houses the water electrolysis apparatus and an electric component chamber that houses the electric component, wherein
the housing chamber has a first ventilation air inlet for introducing external air and the electric component chamber has a second ventilation air inlet for introducing external air, the first ventilation air inlet and the second ventilation air inlet being separate from each other, and
the casing further has a buffering chamber maintained at atmospheric pressure and in communication with the first ventilation air inlet and the second ventilation air inlet.

2. The water electrolysis system according to claim 1, further comprising:
a first ventilator configured to draw the external air out of the housing chamber to maintain the housing chamber at a negative pressure; and
a second ventilator configured to send the external air into the electric component chamber to maintain the electric component chamber at a positive pressure.

3. The water electrolysis system according to claim 1, further comprising a gas detector for detecting flammable gas, wherein
the buffering chamber includes a ventilation air inlet, and
the gas detector is disposed adjacent to the air ventilation inlet.

4. The water electrolysis system according to claim 1, wherein the casing has a storage chamber that houses a reservoir for storing the hydrogen generated by the water electrolysis apparatus, and
the storage chamber has a third ventilation air inlet for introducing external air and the third ventilation air inlet is in communication with the buffering chamber.

5. The water electrolysis system according to claim 1, wherein the electric component chamber is disposed in the buffering chamber, and
the electric component chamber has a ventilation air outlet for expelling air into the buffering chamber.

6. A water electrolysis system comprising:
a water electrolysis apparatus comprising:
an electrolyte membrane having an anode side and a cathode side opposite to the anode side;
a first current collector disposed on the anode side;
a second current collector disposed on the cathode side; and
the water electrolysis apparatus being to electrolyze water to generate oxygen on the anode side and hydrogen on the cathode side;
an electric component to operate the water electrolysis apparatus; and
a casing comprising:
a housing chamber that has a first ventilation air inlet to introduce external air into the housing chamber and that houses the water electrolysis apparatus;
an electric component chamber that has a second ventilation air inlet to introduce the external air into the electric component chamber and that houses the electric component, the first ventilation air inlet and the second ventilation air inlet being separate from each other; and
a buffering chamber being in communication with the first ventilation air inlet and the second ventilation air inlet, an air pressure in the buffering chamber being to be maintained at atmospheric pressure.

7. The water electrolysis system according to claim 6, further comprising:
a first ventilator to draw the external air out of the housing chamber to maintain an air pressure in the housing chamber at a negative pressure; and
a second ventilator to send the external air into the electric component chamber to maintain an air pressure in the electric component chamber at a positive pressure.

8. The water electrolysis system according to claim 6, further comprising:
a gas detector to detect flammable gas,
wherein the buffering chamber has a ventilation air inlet, and
wherein the gas detector is disposed adjacent to the air ventilation inlet.

9. The water electrolysis system according to claim 6,
wherein the casing comprises a storage chamber that houses a reservoir to store the hydrogen generated by the water electrolysis apparatus,
wherein the storage chamber has a third ventilation air inlet to introduce the external air into the storage chamber, and
wherein the third ventilation air inlet is in communication with the buffering chamber.

10. The water electrolysis system according to claim 6,
wherein the electric component chamber is disposed in the buffering chamber, and
wherein the electric component chamber has a ventilation air outlet to expel air into the buffering chamber.

11. The water electrolysis system according to claim 6,
wherein the housing chamber has a largest capacity, and
wherein the buffering chamber has a smallest capacity.

12. The water electrolysis system according to claim 9, further comprising:
a third ventilator to draw the external air out of the storage chamber to maintain an air pressure in the storage chamber at a negative pressure.

\* \* \* \* \*